Dec. 25, 1951 F. R. McFARLAND 2,580,115
ROTARY STEEL SCRAP SHEARING MACHINE
Filed Aug. 5, 1948 5 Sheets-Sheet 1

INVENTOR.
FRANK R. McFARLAND
BY Alfred R. Fuchs
ATTORNEY

Dec. 25, 1951  F. R. McFARLAND  2,580,115
ROTARY STEEL SCRAP SHEARING MACHINE
Filed Aug. 5, 1948  5 Sheets-Sheet 2
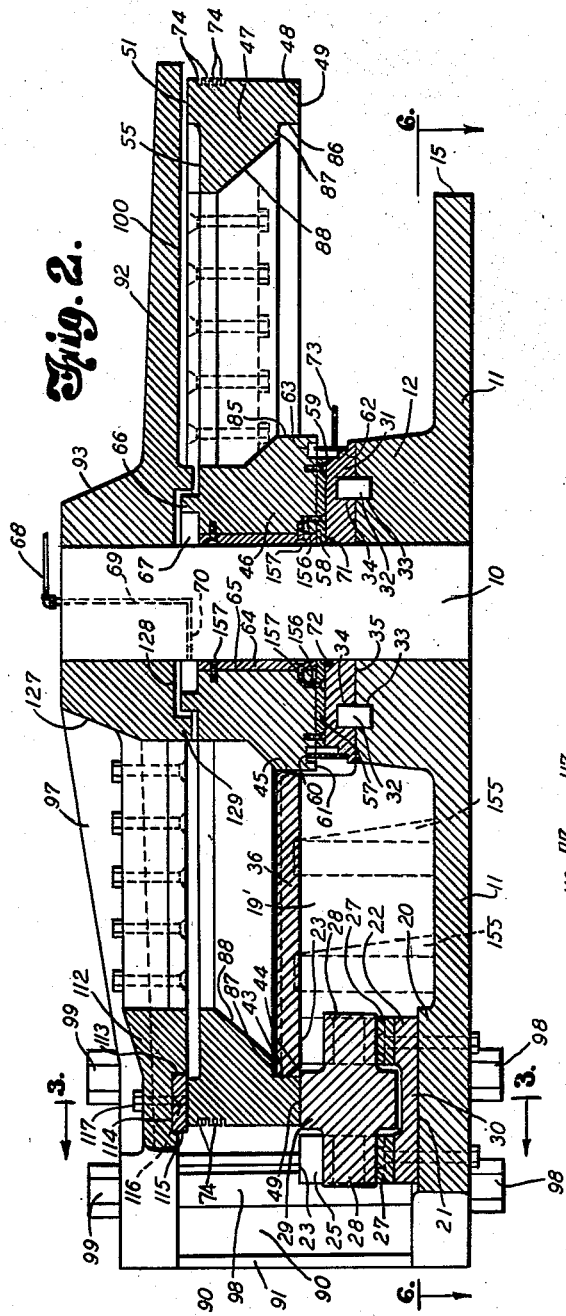
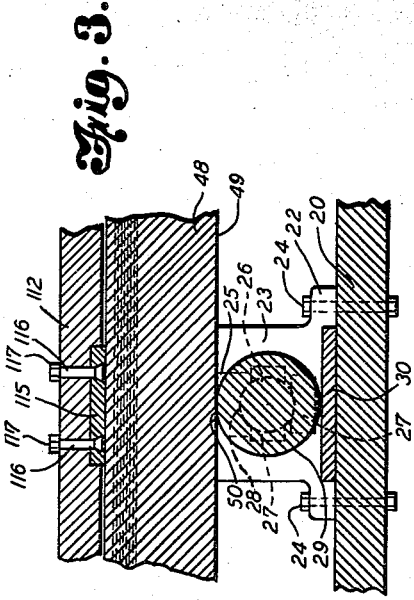
INVENTOR.
FRANK R. McFARLAND
BY
*Alfred R. Fuchs*
ATTORNEY Dec. 25, 1951   F. R. McFARLAND   2,580,115
ROTARY STEEL SCRAP SHEARING MACHINE
Filed Aug. 5, 1948   5 Sheets-Sheet 3

INVENTOR.
FRANK R. McFARLAND
BY
Alfred R. Fuchs
ATTORNEY

Dec. 25, 1951  F. R. McFARLAND  2,580,115
ROTARY STEEL SCRAP SHEARING MACHINE
Filed Aug. 5, 1948  5 Sheets-Sheet 5

INVENTOR.
FRANK R. McFARLAND
BY
Alfred R. Fuchs
ATTORNEY

Patented Dec. 25, 1951

2,580,115

UNITED STATES PATENT OFFICE 2,580,115

ROTARY STEEL SCRAP SHEARING MACHINE

Frank R. McFarland, Houston, Tex., assignor to Sheffield Steel Corporation, a corporation of Ohio Application August 5, 1948, Serial No. 42,716

20 Claims. (Cl. 164—10.6)

My invention relates to shearing apparatus, and more particularly to a rotary machine for shearing steel scrap that because of size and shape is very difficult to shear.

In the manufacture of steel it is customary and necessary to use steel scrap, and such steel scrap includes steel members that are awkward to handle because of their shape and size. It has always been a problem to reduce such ungainly steel members to suitable size for introduction into a furnace with safety to the operator of the shearing means or other cutting means, and the methods of reducing such scrap to proper size for introduction into the furnace has involved the use of relatively slow methods of cutting, such as by means of a cutting torch or by means of an alligator shear, for example. The use of such means as previously existed involves danger of injury to the user of such means as well as loss of much time. It is the principal purpose of my invention to provide means whereby such steel scrap difficult and awkward to shear or cut can be reduced to proper length by a shearing operation.

In order to accomplish the shearing of steel members of large size and awkward shape, such as bedsteads, automobile frames, etc., it is necessary to have a device that has shearing members one of which approaches the other under sufficient momentum that the member to be sheared will be sheared and the operation of the movable shearing member will not be stopped or halted by engagement with the piece of scrap that is to be sheared. Also the stationary as well as the moving parts of the apparatus must be of extremely rugged construction so as to withstand the shock produced by the shearing action and the forces that are exerted by the engagement of the movable jaw or shear blade with the piece of scrap that is to be reduced in size and the consequent engagement of the piece of scrap with the shear blade that is carried by the stationary part of the apparatus.

My invention is particularly directed to accomplishing such a shearing action on a piece of steel scrap of awkward size or shape, by providing a rotatable member which is rotatable about a vertical axis, which is of extremely large mass and which has the movable shearing means mounted thereon, said rotatable member of great mass being mounted on a vertical shaft which is stationary and which is mounted on a base member of great weight and extreme ruggedness in structure. In the embodiment of my invention at present preferred the stationary member of the shearing means is mounted on a member of great mass, which is fixed in position on the above referred to base member.

In the apparatus that forms the subject matter of this invention the shearing is accomplished by a movement of the one shear blade past the other shear blade in a horizontal direction, the scrap being fed between said shear blades in a downward direction and the base member being provided with means for halting the downward movement of the scrap so as to position the lower end of the piece of scrap a predetermined distance from the plane of shear so as to shear or cut off pieces of the heavy scrap of predetermined length.

The movable member of the shearing apparatus, preferably, is in the form of a wheel of extremely large diameter and of great mass, which has a pair of openings therein having a shearing blade mounted at one corner of each of said openings and which wheel-like member is driven from its periphery by suitable driving means, such as a rope drive, so as to rotate at a relatively small number of revolutions per minute, approximately twenty to thirty revolutions per minute having been found to be desirable.

It is a particular feature of my invention to provide in cooperation with such a rotatable member cooperating shearing means comprising a stationary member of large mass that extends transversely of the path of movement of the above referred to shear blade, or substantially radially relative to the axis of rotation of said wheel-like member, which member carrying said stationary shear blade is mounted in vertical alignment with a supporting member that acts as stop means for limiting the downward movement of the scrap as it passes into the opening in the rotatable member.

In view of the tremendous forces that are exerted in an apparatus of the character of the device forming the subject matter of this invention, it is necessary to provide means for resisting any forces that would create a tendency of the shear blades to wobble or tilt relative to each other, said means comprising a roller to resist the downward thrust exerted on the rotatable member at the point at which the shearing action takes place and a shoe on the stationary member carrying the stationary shear blade adapted to be engaged by the upper side of the rotatable member to resist any wobbling or tilting action thereof at substantially the point where the roller supports said rotatable member against any wobbling or tilting movement on its under side.

My invention further involves means for adequately lubricating the moving parts, particularly the lubrication of the bearings of the rotatable member on the stationary shaft and the construction of the bearing means for said rotatable member.

Other objects and advantages of my invention will appear as the description of the drawings proceeds. I desire to have it understood, however, that I do not intend to limit myself to the particular details shown or described, except as defined by the claims.

In the drawings:

Fig. 2 is a vertical sectional view through the same, taken substantially on the line 2—2 of Fig. 1.

Fig. 3 is a vertical sectional view taken on a plane transversely to that of Fig. 2, as indicated by the lines 3—3 on Figs. 1 and 2.

Figure 1:
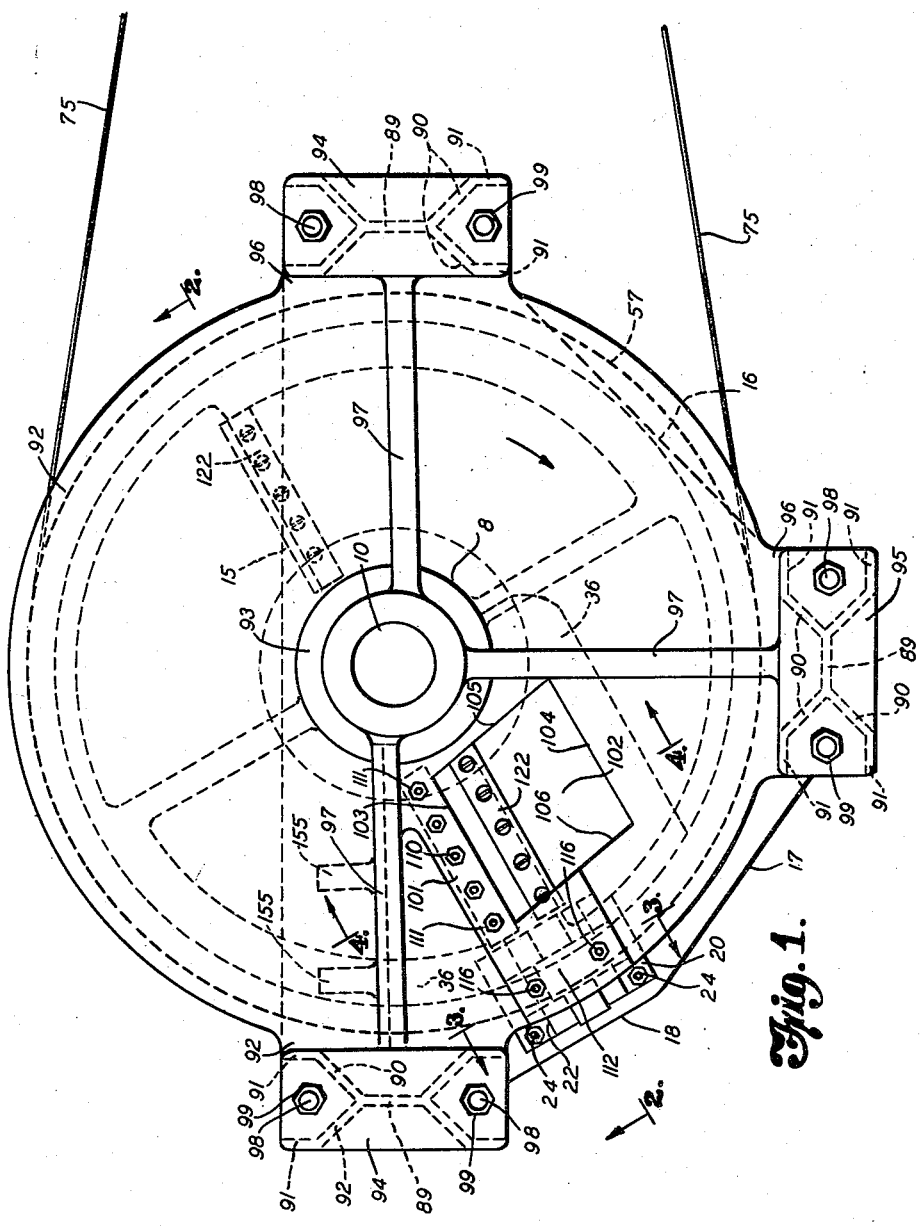
Fig. 1 is a top plan view of my rotary shearing apparatus, the driving means therefor being omitted.
Figure 5:
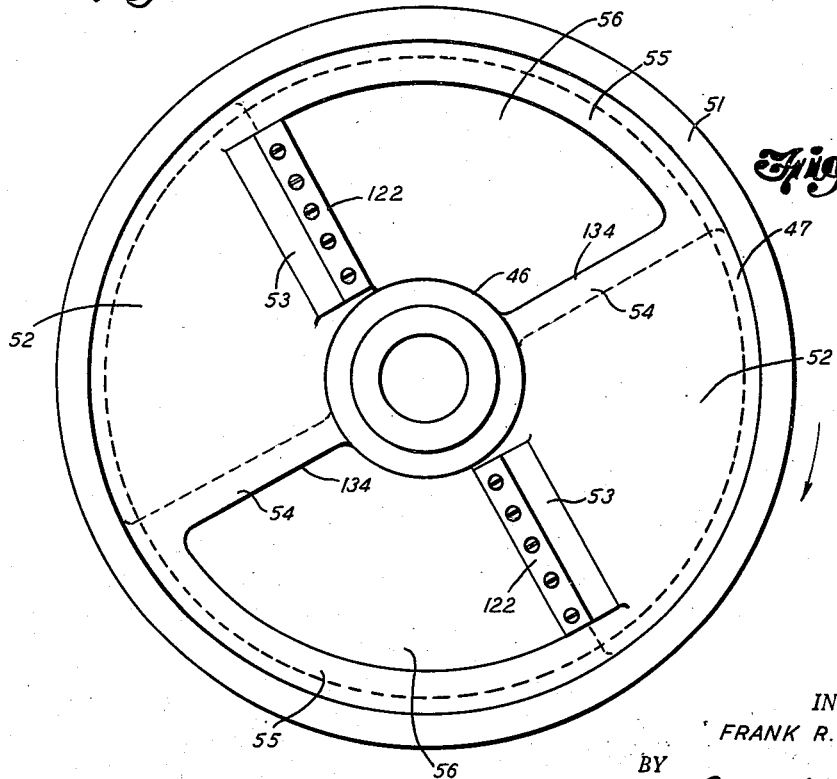
Fig. 5 is a plan view of the rotary shearing member detached.

Referring in detail to the drawings, it will be noted that the showing of the apparatus in Figs. 1 to 3, inclusive, and Fig. 5, is on an extremely small scale due to the fact that the device is of extremely large size. In order to provide an adequate idea of the great moving mass that is involved, it is here pointed out that the wheel or rotating member shown in Fig. 5 should be at least twenty-three feet in diameter and the shaft upon which said rotary member is mounted is thirty inches in diameter and nine feet long or tall.

Figure 8:
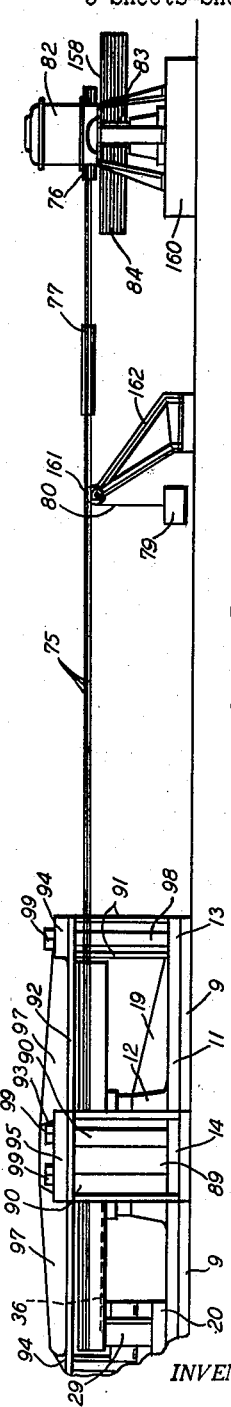
Fig. 8 is a side elevation thereof.

Said shaft 10 is mounted on a base casting 11, which has a hub portion 12 in which the shaft is mounted in fixed position. The base casting 11 is of a plate-like character and has a plurality of lateral projections thereon, a pair of said projections being diametrically opposite each other with relation to the hub 12 and being indicated by the numeral 13. The base member is also provided with a lateral projection 14 that is similar to the projections 13, but lies substantially midway therebetween and in alignment with the hub 12. Said base member has a substantially straight edge portion 15 on the side thereof opposite the projection 14 connecting the lateral projections 13, and has an obliquely extending edge portion 16 extending from one of the projections 14 to a projection 13, and has a pair of edge portions 17 and 18 extending at a slight angle to each other, that connect the other projection 13 with the projection 14, thus forming a base member that is of a shape that approaches triangular, with the three projections thereon as above described. Reinforcing ribs 19 extend between the hub portion 12 and one of the projections 13 between said hub portion and the projection 13, and a reinforcing rib 19 extends between the hub portion 12 and the other projection 13. Other reinforcing ribs may be provided on the base member if found to be desirable or necessary, such as the ribs 9 shown in Fig. 8.

The base member 11 is provided with a thickened portion 20, which has a raised flat top face 21, upon which the bearing structure 22 is mounted, said bearing structure 22 having upstanding end portions 23 and being secured to the thickened portion 20 of the base member by means of bolts 24 or similar headed securing elements. The upstanding portions 23 of said bearing structure have slots 25 therein that are open at their upper ends and said upstanding portions have transverse grooves or slots therein, in which the bearing members 26 are mounted. Said slots 25 also have the bearing members 27 mounted in the bottoms thereof. The integral shaft portions 28 of the roller 29 are mounted in the bearings thus provided, and it will be noted that the bearing structure is provided with a reduced portion at 30 to accommodate the roller 29.

The hub portion 12 has a bearing block or plate 31 mounted thereon in fixed position by means of pins or posts 32, which extend into suitable recesses 33 and 34 in the hub portion 12 and block 31, respectively. The base member 11 is not finished except on the surface 21 and the surface 35 upon which the bearing block 31 is mounted and is, preferably, made by casting. Said base member is also provided with suitable means for mounting a heavy plate-like member 36 on the one rib 19 and the rib 19' thereof. The means for mounting said member 36 on the rib 19 comprises a frame 37 that is mounted on the reinforcing rib 19 extending from the hub portion 12 to the projection 14. Said frame member 37 is trapezoidal so that the bottom member 39 thereof will rest flatly on the top surface of the reinforcing rib 19 for securement thereto by means of securing elements 40, and the top member 41 thereof will extend horizontally so as to receive the bottom face of the plate 36 flatly. Said plate-like member 36 is secured to the frame by means of securing elements 42 and rests on one of the upstanding members 25 of the bearing structure 22, as shown in Fig. 2. Said plate 36 has a convexly curved outer vertical edge portion 43, a beveled edge portion 44, and a concavely curved edge portion 45 that is slightly beveled, as will be evident from Fig. 2, said plate being generally of the shape shown in Fig. 1. The plate 36 has a reduced portion 150 overlying the top flat face 151 of the rib 19' to provide a shoulder 152 on the plate engaging a shoulder 153 on said rib provided thereon between the flat top face 151 and the depressed ledge or shoulder 154 thereon, upon which the main body portion of said plate 36 rests. The rib 19' is taller than the hub 12 and has a plurality of lateral reinforcing ribs 155 extending between the same and the body portion of the base 11.

Mounted on the upstanding or vertical stationary shaft 10 is the hub portion 46 of a rotatable member of considerable mass, which has a rim portion 47, which has a depending annular rib 48 thereon, that has a flat or plane bottom face 49 provided thereon that is adapted to engage with the roller 29 at 50, as indicated in Fig. 3. Said wheel-like member also has an upstanding annular rib 51 thereon at the rim portion thereof and has web portions 52 extending between the hub portion 46 and the rim portion 47, said web portions being plane faced, as will be evident from Fig. 4, and having upstanding reinforcing ribs 53 thereon at one end of each thereof, and reinforcing ribs 54 on the under side thereof at the other end of each thereof. The web portions 52 are substantially sector-shaped, and these alternate with sector-shaped openings 56 in the wheel-like member, said openings being slightly narrower than the web portion 52 is a radial direction so that the ledges 55 are provided opposite the openings 56.

The hub portion 46 has a flat bottom face 57 that has a bearing plate 58 of anti-friction metal, such as brass or bronze, secured thereto by means of countersunk screws 156. Said bearing plate 58 engages the finished top face of the reduced upper end portion 59 of the bearing block 31. Said hub member also has an annular groove 60 therein and a depending annular skirt portion 61, while the block 31 is provided with an annular shoulder portion 62, and a ring-like oil retaining and dust guard member 63 is provided, which is mounted in said groove 60 and is secured to the shoulder 62. The bearing plate 58 is circular in character, having a circular opening for receiving the shaft 10. Also secured in a bore 65 in the hub 46 by means of the countersunk screws 157 is a bushing or sleeve 64 of brass or similar anti-friction metal, said bushing or sleeve having bearing engagement with the shaft 10. The hub member also has an upstanding annular rib 66 thereon that defines an oil reservoir 67.

Suitable lubricating means for the bearing thus provided for the rotatable member comprises an oil supply pipe 68, which supplies lubricating oil to a vertical passage 69 in the shaft 10, from which a passage 70 extends into the oil reservoir 67. The bearing block 31 is provided with a shoulder or offset at 71 which, together with the bearing plate 58, provides a groove for the oil retaining packing ring 72, and an oil return pipe 73 is provided for returning the oil to the oil supply reservoir from the chamber provided between the ring member 63 and the reduced portion 59 of the member 31. Thus lubricant is circulated continuously through the bearing means provided for the rotatable wheel-like member having the hub 46.

The wheel-like or rotatable shearing member is driven by a rope drive, which operates in the annular grooves 74 provided in the peripheral edge portion of the rim 47 of said wheel-like member. The drive means, preferably, is a single continuous cable or rope 75, which extends continuously from one groove in a multiple groove driving sheave 76 to a groove 74 and in said groove 74 around a large portion of the periphery of the rim 47, then in the next groove of the driving sheave 76 and so on until the last groove 74 is reached, the last turn of said continuous rope or cable extending into the lowermost groove of the driving sheave 76 and then extending as indicated at 75' to a take-up pulley 77.

The take-up pulley 77 is provided with suitable means for tensioning the wire rope 75 comprising a weight 79 having the flexible member 80 secured thereto and to the pulley block 81 carrying the take-up pulley 77. The length 75" of the wire rope 75 extends from the take-up pulley 77 back to the uppermost groove of the drive sheave 76, thus providing for the necessary change in direction of the rope or cable 75 between its point of leaving the sheave 76 and its return thereto, due to the fact that it enters a different groove on the sheave 76 than it left at 75'. Any suitable means may be provided for driving the drive pulley 76, a motor 82 being shown as driving a V-groove pulley 83 over which the multiple V-belts 84 operate, said V-belts operating over a very large V-groove pulley 158. The pulley 158 is fixed to the shaft 159 to which the multiple sheave 76 is also fixed. The motor 82 and shaft 159 are, preferably, mounted on a suitable base 160. The flexible member 80 operates over a pulley 161 mounted on a suitable frame 162. The wheel-like member of very large mass, preferably, rotates at between 20 and 30 revolutions per minute, and it has been found that a 100 horse power motor having a speed of 690 revolutions per minute is adequate for driving said rotating member.

It will be noted that not only does the inner peripheral edge portion 45 of the plate-like member 36 conform to the curvature of the outer face 85 of the hub portion 47, but that the vertical edge portion 43 conforms to the curvature of the inner vertical wall portion 86 of the depending annular rib 48, said plate fitting under the shoulder 87 between the inclined portion 88 of the rim 47 and the vertical wall 86, there being sufficient space between the inner and outer edges of said stationary plate 36 and the adjacent walls of the rotatable member that there will be no frictional contact between these parts as the rotatable wheel-like member rotates.

Figure 6:
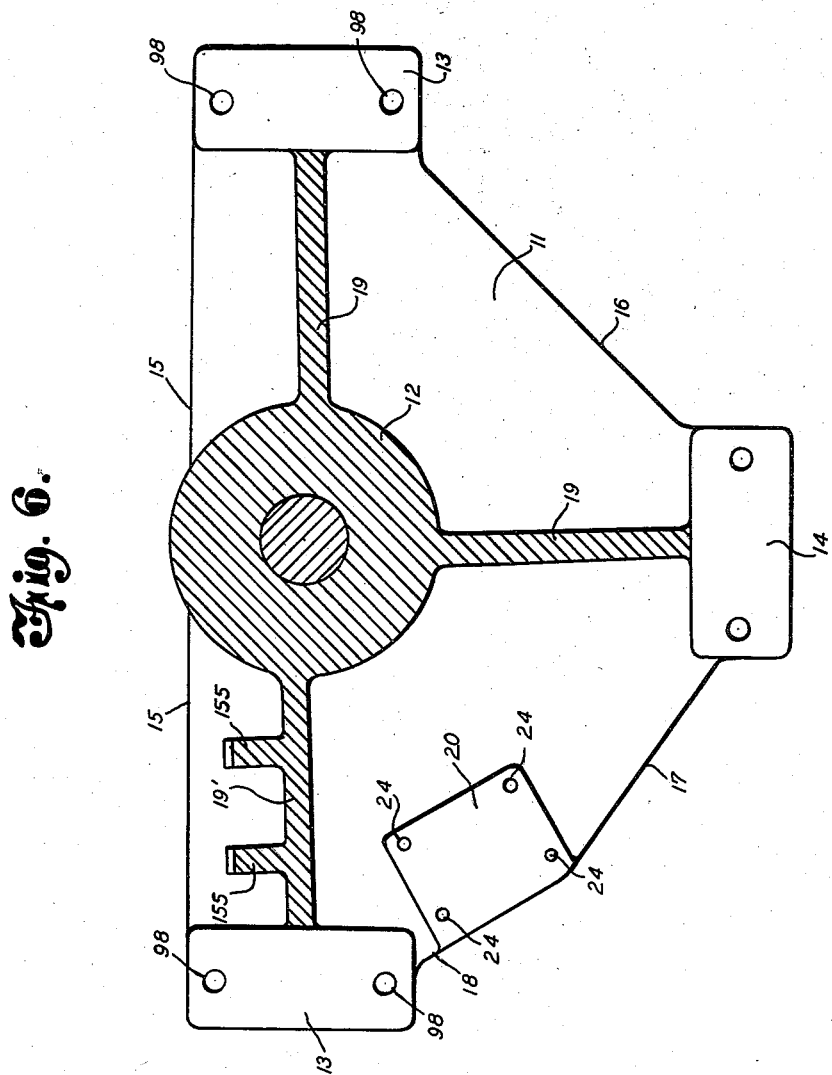
Fig. 6 is a section taken substantially on the line 6—6 of Fig. 2.
Figure 7:
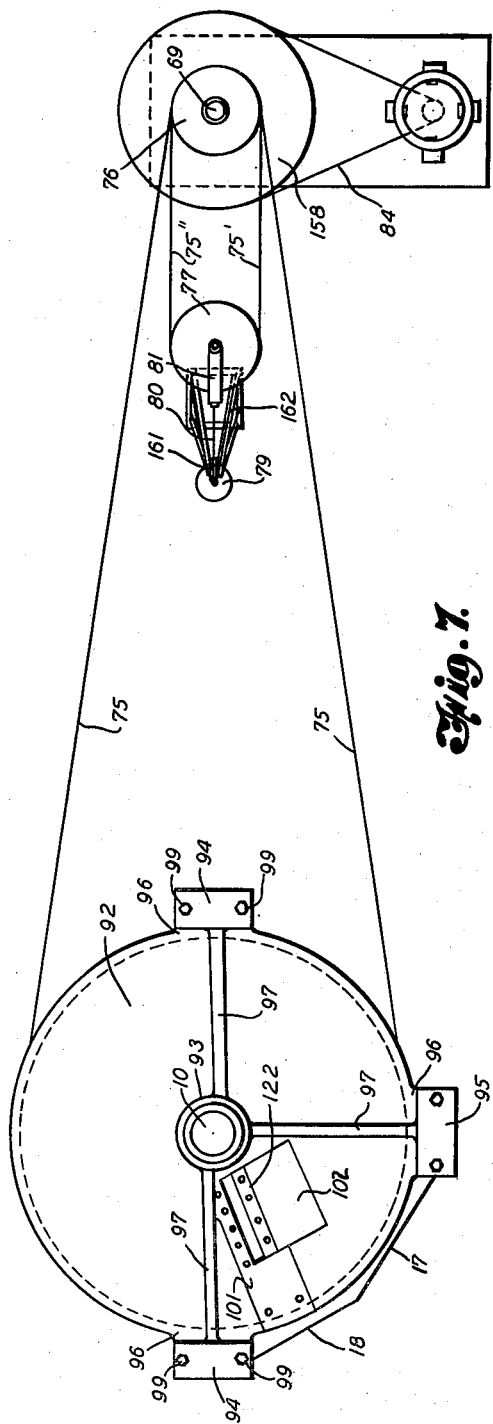
Fig. 7 is a plan view of the rotary shearing apparatus on a smaller scale than Fig. 1, showing the driving means.

Mounted on the extensions 13 and 14 of the base member are vertical columns that serve as supporting means for the stationary top member of the shearing device. Said columns comprise a central vertically extending web portion 89 from the opposite ends of which diverging legs 90 extend, which terminate in parallel end portions 91. Said spacer members or columns are mounted with the lower end edges thereof on the flat top faces of the rectangular extensions 13 and 14 of said bottom plate 11, said extensions being slightly thicker than the main body portion of said bottom plate 11, as will be obvious from Figs. 2 and 6. A top member that has a substantially circular body portion 92 is provided, said body portion being of a plate-like character and tapering slightly from the central hub portion 93 thereon toward the peripheral edge thereof, as will be obvious from Fig. 2. Lateral extensions 94 and 95 are provided on said body portion 92, which are substantially flat topped and are slightly thicker than the main body portion 92 of said top member and the connecting portions 96 between said thickened members 94 and 95 and said substantially circular body portion. Reinforcing ribs 97 extend from the hub portion 93 to the laterally projecting thickened portions 94 and 95. Bolts 98 and nuts 99 clamp the base member and top member together by clamping the projections 94 to the projections 13, with the spacing members therebetween, and by clamping the projection 95 to the projection 14, with the spacing member between the same. Thus the top member is firmly secured in fixed position on the base member.

The body portion 92 of said top member is substantially flat on the bottom face 100 thereof and, as will be obvious from Figs. 1 and 2, said member 92 extends slightly beyond the periphery of the rim portion 47 of the rotatable shearing member. In addition to the reinforcing ribs 97, the body portion 92 of the top member is also provided with a thickened portion or wide reinforcing rib 101, which extends at an angle to one of the ribs 97. Said thickened portion is provided in said plate-like top portion adjacent an opening 102 in said top plate member 92, which has a marginal edge 103 at the thickened portion 101, which extends at a slight angle to the radial, and a marginal edge 104 substantially parallel to said edge 103 on the opposite side of said opening, an inner edge 105 extending at an oblique angle to the edges 103 and 104 and an outer edge 106, that is parallel to the inner edge 105, as will be obvious from Fig. 1.

The thickened portion 101 is provided with a cut away portion on the lower side thereof to provide a vertical wall 107 and a horizontal upwardly offset wall 108 to provide a recess in the bottom corner of the thickened portion 101 opening into the edge 103, in which a shear blade 109 is mounted, said shear blade being held in position by means of bolts 110 and nuts 111. The thickened portion 101 also has a wide thickened portion 112 lying radially outwardly therefrom and aligning with a portion of the opening 102, which thickened portion 112 is cut away to provide a vertical shoulder 113 and a horizontal shoulder 114 providing a recess in which a chrome-nickel steel shoe 115 is mounted, against which the upper annular plane faced portion 51 of the rim 47 engages, as shown in Fig. 2. Thus the roller 29 and the shoe 115 combine to hold the rotatable member from any wobble or tilt when shearing is taking place. The shoe 115 is held in position by means of countersunk bolts 116 and nuts 117.

The rotatable shearing member is provided with a depending flange or rib 118, which has a thickened portion 119 at the forward end of each of the sector-shaped members 52, the direction of rotation of the rotatable member being in the direction of the arrows in Figs. 1 and 5, and by the forward edge being meant that which is forwardmost during rotation of said rotatable shearing member. Also at the forward edge of each of said sector-shaped portions 52 the thickened portion 53 is cut away so as to provide a vertical shoulder 120 and a horizontal ledge or shoulder 121, providing a recess in the upper corner of the forward edge of said sector-shaped portion 52 for a movable shear blade 122. There are two of the shear blades 122, as will be obvious from Figs. 1 and 5, and said shear blades 122 are, preferably, slightly recessed at 123 around the bolt heads, the shear blades 109 being similarly recessed at 124. The shear blades 123 are held in position on the rotatable member by means of countersunk bolts 125 and nuts 126. Said shear blades 109 and 122 are made of high grade tool steel and are tempered to withstand the stresses to which the same are subjected when shearing action takes place between the lower right angular exposed corner portion of the blade 109 and the upper right angular exposed corner portion of a shear blade 122.

The hub portion 93 of the upper or top member of the shearing apparatus is mounted in fixed position on the vertical shaft 10 and is slightly tapering or cone-shaped on the upper end portion 127 thereof. The under side of the hub portion 93 is recessed, as at 28, to loosely receive the annular flange 66, thus providing a depending anular flange 129 that loosely embraces the annular flange 66.

Figure 4:
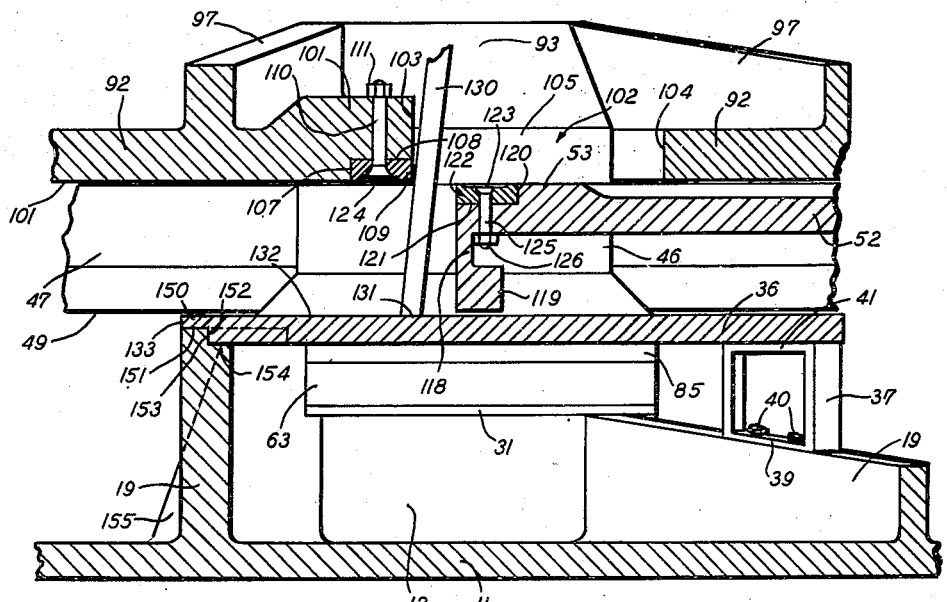
Fig. 4 is a vertical detail sectional view through the cooperating shearing members and adjoining parts, taken on the line 4—4 of Fig. 1.

In operation the piece of scrap that is to be sheared, which is indicated at 130 in Fig. 4, is fed downwardly from above the top plate member 92 until the lower end 131 thereof engages the flat top face 132 of the plate-like member 36. The scrap, such as an automobile frame or bedstead or similar oddly shaped member of ungainly proportions, passes downwardly through the opening 102 in being fed and into one of the openings 56 on the rotating shear member. As the rotating shear member rotates in the direction indicated by the arrow in Figs. 1 and 5, one of the forward end portions having the depending rib 118 thereon will move toward the side 103 of the opening 102, or from right to left as viewed in Fig. 4, and dependent upon the cross sectional area of the piece of scrap 130 that is to be sheared, will engage with said piece of scrap at a point spaced from the edge 103 of the opening. Then the cooperating shear blades 109 and 122 will shear the piece between the bottom corner of the shear blade 109 and the top corner of the shear blade 122, which are arranged to just pass each other.

After a length has thus been sheared off the piece of scrap it will be moved by the depending portion 118 of the rotatable member toward the left as viewed in Fig. 4 until it drops off the edge 133 of the plate-like member 36, which edge lies substantially under the one rib 97, as will be obvious from Fig. 4, and can then be discharged in any suitable manner from the machine. Not only will the piece of sheared off scrap tend to discharge from the edge 133, but it will also tend to travel to the outer edge portion 43 of said plate-like member due to the centrifugal force exerted thereon by the rotatable member and will thus have a tendency to be thrown outwardly as it leaves the plate or platform 36. Any suitable deflecting or guiding means can be provided for discharging the sheared off pieces of scrap from the machine or any suitable means can be provided for mechanically removing the sheared off pieces of scrap discharged from the plate 36.

The piece or pieces of scrap from which part has been sheared will have the lower sheared edges thereof engage with the top of the thickened or rib portion 53 and then with the plate-like member 52 as the rotation of the rotatable shearing member continues, and this will continue until the sheared lower ends of said pieces of scrap pass off the sectors 52 at the rear edge 134 of plate-like portion 52 and thus into the opening 56 diametrically opposite the opening 56 in which the previously sheared off length of scrap had been located when the first shearing action took place. The shear blade 122 substantially diametrically opposite the previously acting shear blade 122, will now cooperate with the shear blade 109 to cut off another length in other lengths of the piece or pieces of scrap in the same manner as previously described. This will continue with each piece of scrap until a piece thereof will pass into an opening 56 that is too short to be engaged by the shear blades, such piece of course, passing merely into the opening 56 and off the plate 36 during the operation of the machine.

What I claim is:

1. In a machine for shearing steel scrap, a massive base member having a stop surface thereon, a massive stationary shear blade mounting member fixed on said base member, said blade mounting member having an opening therein above said stop surface, a shear blade mounted on said mounting member along a margin of said opening, a massive circular member mounted to rotate between said stop surface and said shear blade about a vertical axis and having an opening therein aligning with said first mentioned opening during rotation thereof, and a shear blade mounted on said rotatably mounted circular member at a margin of said opening therein to cooperate with said stationary shear blade.

2. In a machine for shearing steel scrap, a massive base member, a stop plate having a wide, flat horizontal stop surface thereon supported by said base member, a massive stationary shear blade mounting member fixed on said base member, said blade mounting member having an opening therethrough above said stop surface, a shear blade mounted on said mounting member along a margin of said opening, a massive member mounted to rotate between said stop plate and said shear blade about a vertical axis and having an opening therethrough aligning with said first mentioned opening during rotation thereof, and a shear blade mounted on said rotatably mounted member at a margin of said opening therein to cooperate with said stationary shear blade.

3. In a machine for shearing steel scrap, a massive base member having a stop surface thereon, a massive stationary shear blade mounting member having a plate-like body portion extending above said base member in spaced relation thereto, said mounting member being fixed on said base member, said plate-like body portion having an opening therethrough above said stop surface, a shear blade mounted on said mounting member along and co-extensive with a margin of said opening, a massive circular shearing member mounted to rotate between said stop surface and said shear blade about a vertical axis and having an opening therethrough aligning with said first mentioned opening during rotation thereof, said plate-like body portion covering the major portion of said rotatably mounted member, and a shear blade mounted on said rotatably mounted member at and co-extensive with a margin of said opening therein to cooperate with said stationary shear blade.

4. In a machine for shearing steel scrap, a massive base member, a stop plate having a wide, flat horizontal stop surface thereon supported by said base member, a massive stationary shear blade mounting member having a horizontally extending plate-like body portion extending above said base member in spaced relation thereto, said mounting member being fixed on said base member, said plate-like body portion having an opening therethrough above said stop surface, a shear blade mounted on said mounting member along and co-extensive with a margin of said opening, a massive circular shearing member mounted to rotate between said stop plate and said shear blade about a vertical axis and having an opening therethrough aligning with said first mentioned opening during rotation thereof, said plate-like body portion covering the major portion of said rotatably mounted member, and a shear blade mounted on said rotatably mounted member at and co-extensive with a margin of said opening therein to cooperate with said stationary shear blade.

5. In a machine for shearing steel scrap, a massive base member having a wide, flat horizontal stop surface thereon, a massive stationary shear blade mounting member having a horizontally extending plate-like body portion extending above said base member and having a wide, flat under face in spaced relation thereto, said mounting member being fixed on said base member, said plate-like body portion having an opening therethrough above said stop surface, a shear blade mounted on said mounting member along a margin of said opening, a massive circular member having a wide flat top face mounted to rotate between said stop surface and said shear blade about a vertical axis and having an opening therethrough aligning with said first mentioned opening during rotation thereof, said plate-like body portion covering the major portion of said rotatably mounted member, and a shear blade mounted on said rotatably mounted member at a margin of said opening therein to cooperate with said stationary shear blade.

6. In a machine for shearing steel scrap, a massive base member, a wide, flat stationary stop plate supported thereon, a massive stationary shear blade mounting member fixed on said base member, the major portion of said blade mounting member being plate-like and said plate-like portion having an opening therein above said stop plate, a shear blade mounted on said mounting member along a margin of said opening, a massive circular shearing member mounted to rotate between said stop plate and said shear blade about a vertical axis and having an opening therein aligning vertically with said first mentioned opening and said stop plate during rotation thereof, and a shear blade mounted on said rotatably mounted member at a margin of said opening therein to cooperate with said stationary shear blade.

7. In a machine for shearing steel scrap, a massive base member, a wide, flat, stationary horizontally disposed stop plate mounted thereon, a massive stationary shear blade mounting member having a substantially circular plate-like body portion extending substantially parallel to said stop plate and having a wide, flat under face in vertically spaced relation thereto, said mounting member being fixed on said base member, said plate-like body portion having a central hub portion and having a wide opening therein between said hub portion and the marginal edge thereof and above said stop plate, a shear blade mounted on said mounting member along a margin of said opening, a massive circular shearing member mounted to rotate between said stop plate and said shear blade about a vertical axis and having a wide opening therein aligning with said first mentioned opening and said stop plate during rotation thereof, and a shear blade mounted on said rotatably mounted member at a margin of said opening therein to cooperate with said stationary shear blade.

8. In a machine for shearing steel scrap, a massive base member having a stop surface thereon, a massive stationary shear blade mounting member fixed on said base member, said blade mounting member having an opening therein above said stop surface, a massive member mounted to rotate between said stop surface and said mounting member about a vertical axis, said opening having a straight marginal edge extending transversely to the rotational path of said rotatable member, a straight stationary shear blade mounted on said mounting member along and co-extensive with said marginal edge, said rotatable member having an opening therein having a straight marginal edge aligning with said first mentioned marginal edge during rotation thereof, and a straight shear blade mounted on said rotatable member along and co-extensive with said last mentioned marginal edge to cooperate with said stationary shear blade.

9. In a machine for shearing steel scrap, a massive base member having a stop surface thereon, a hub on said base member, a stationary vertical shaft mounted in said hub, a bearing block on said hub, a massive stationary shear blade mounting member fixed on said base member, said blade mounting member having an opening therein above said stop surface, a shear blade mounted on said mounting member along a margin of said opening, a massive circular member mounted to rotate about said shaft between said stop surface and said shear blade and having an opening therein aligning with said first mentioned opening during rotation thereof, said rotatable circular member having a hub portion engaging said bearing block, a shear blade mounted on said rotatably mounted member at a margin of said opening therein to cooperate with said stationary shear blade, and driving means for said rotatable member comprising a flexible member extending partially around and engaging the periphery of said rotatable member.

10. In a machine for shearing steel scrap, a massive base member having a stop surface thereon, a massive stationary shear blade mounting member fixed on said base member, said blade mounting member having an opening therein above said stop surface, a shear blade mounted on said mounting member along a margin of said opening, a massive wheel-like member mounted to rotate between said stop surface and said shear blade about a vertical axis and having alternating horizontally disposed web portions and openings aligning with said first mentioned opening during rotation thereof, and a shear blade mounted on said rotatably mounted member at a margin of each of said openings therein to cooperate with said stationary shear blade.

11. In a machine for shearing steel scrap, a massive base member having a stop surface thereon, a massive stationary shear blade mounting member fixed on said base member, said blade mounting member having an opening therein above said stop surface, a shear blade mounted on said mounting member along a margin of said opening, a massive wheel-like member mounted to rotate between said stop surface and said shear blade about a vertical axis and having alternating horizontally disposed web portions and openings aligning with said first mentioned opening during rotation thereof, a shear blade mounted on said rotatably mounted member at a margin of each of said openings therein to cooperate with said stationary shear blade, and driving means for said wheel-like member comprising a flexible member extending partially around and engaging the periphery of said wheel-like member.

12. In a shearing machine of the character described, a base member having a hub-like upward projection thereon having a vertical bore therein, a vertical shaft mounted in said bore and extending upwardly from said base member, means on said base member providing a flat top face thereon of less area than said base member, a circular rotatable member having a hub portion mounted for rotation on said shaft above said base member, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said circular member and said circular body portion having openings therein having marginal edges extending transversely to the rotational path of said rotatable member and adapted to pass each other during rotational movement of said rotatable member, cooperating shear blades mounted along said marginal edges, and driving means for said rotatable member.

13. In a shearing machine of the character described, a base member having a hub-like upward projection thereon having a vertical bore therein, a vertical shaft mounted in said bore and extending upwardly from said base member, means on said base member providing a flat top face thereon of less area than said base member, a circular rotatable wheel-like member having a hub portion mounted for rotation on said shaft above said base member and having a rim portion having a grooved periphery, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said rotatable member and said circular body portion having openings therein having marginal edges extending transversely to the rotational path of said rotatable member and adapted to pass each other during rotational movement of said rotatable member, cooperating shear blades mounted along said marginal edges, and driving means for said rotatable member comprising a flexible driving member engaging the grooved periphery of said wheel-like member.

14. In a shearing machine of the character described, a base member having a hub-like upward projection thereon having a vertical bore therein, a vertical shaft mounted in said bore and extending upwardly from said base member, means on said base member providing a flat top face thereon of less area than said base member, a circular rotatable wheel-like member having a hub portion mounted for rotation on said shaft above said base member, a rim portion and a web portion having spaced openings therein extending between said hub and rim portions, said openings having marginal edges extending transversely of the rotational path of said wheel-like member, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said circular body portion having an opening therein having a marginal edge extending transversely of said rotational path, said first mentioned marginal edges passing said last mentioned marginal edge during rotational movement of said rotatable member, cooperating shear blades mounted along said marginal edges, and driving means for said rotatable member.

15. In a shearing machine of the character described, a base member having a hub-like upward projection thereon having a vertical bore therein, a vertical shaft mounted in said bore and extending upwardly from said base member, means on said base member providing a flat top face thereon of less area than said base member, a circular rotatable member having a hub portion mounted for rotation on said shaft above said base member, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said rotatable member and said circular body portion having openings therein having marginal edges extending transversely to the rotational path of said rotatable member and adapted to pass each other during rotational movement of said rotatable member, cooperating shear blades mounted along and co-extensive with said marginal edges, said rotatable member and said top member having marginal reinforcing ribs thereon provided with recesses in which said shear blades are seated, and driving means for said rotatable member.

16. In a shearing machine of the character described, a base member having a hub-like upward projection thereon having a vertical bore therein, a vertical shaft mounted in said bore and extending upwardly from said base member, a circular rotatable member having a hub portion mounted for rotation on said shaft above said base member, a plate-like top member having a circular body portion arranged co-axially to said shaft and having a central hub portion mounted on said shaft, means for mounting said top member in fixed position on said base member comprising means between said base member and top member spacing said top member from said base member, a wide, flat topped plate-like member supported upon said base member in spaced relation below said top member to provide for passage of said rotatable member between said top member and said flat topped member during rotation thereof, said rotatable member and said circular body portion having openings therein aligning with said flat topped plate-like member and with each other and having marginal edges extending transversely to the rotational path of said rotatable member and adapted to pass each other during rotational movement of said rotatable member, cooperating shear blades mounted along and co-extensive with said marginal edges, and driving means for said rotatable member.

17. In a shearing machine of the character described, a base member having a hub-like upward projection thereon having a vertical bore therein, a vertical shaft mounted in said bore and extending upwardly from said base member, means on said base member providing a flat top face thereon of less area than said base member, a circular rotatable member having a hub portion mounted for rotation on said shaft above said base member, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said rotatable member and said circular body portion having openings therein having marginal edges extending transversely to the rotational path of said rotatable member and adapted to pass each other during rotational movement of said rotatable member, cooperating shear blades mounted along said marginal edges, a thrust resisting roller mounted on said base member in substantially longitudinal alignment with the shear blade on said top member and engaged by said rotatable member, and driving means for said rotatable member.

18. In a shearing machine of the character described, a base member having a hub-like upward projection thereon having a vertical bore therein, a vertical shaft mounted in said bore and extending upwardly from said base member, means on said base member providing a flat top face thereon of less area than said base member, a circular rotatable member having a hub portion mounted for rotation on said shaft above said base member, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said rotatable member and said circular body portion having openings therein having marginal edges extending transversely to the rotational path of said rotatable member and adapted to pass each other during rotational movement of said rotatable member, cooperating shear blades mounted along said marginal edges, a thrust resisting roller mounted on said base member in substantially longitudinal alignment with the shear blade on said top member and engaged by said rotatable member, a cooperating shoe on said top member in vertical alignment with said roller, and driving means for said rotatable member.

19. In a shearing machine of the character described, a base member having a hub-like upward projection thereon having a vertical bore therein, a vertical shaft mounted in said bore and extending upwardly from said base member, means on said base member providing a flat top face thereon of less area than said base member, flat topped lateral projections on said base member, a circular rotatable member having a hub portion mounted for rotation on said shaft above said base member, a plate-like top member having a circular body portion arranged co-axially to said shaft and provided with lateral flat bottom faced projections thereon aligning with the lateral projections on said base member and having a central hub portion mounted on said shaft, means for mounting said top member in fixed position on said base member comprising spacing members mounted between said lateral projections to space said base and top members to provide for rotation of said rotatable member between said flat top face and the bottom face of said top member, said rotatable member and said circular body portion having openings therein having marginal edges extending transversely to the rotational path of said rotatable member and adapted to pass each other during rotational movement of said rotatable member, cooperating shear blades mounted along said marginal edges, and driving means for said rotatable member.

20. In a shearing machine of the character described, a base member having a hub-like upward projection thereon having a vertical bore therein, a stationary vertical shaft mounted in said bore and extending upwardly from said base member, said hub-like projection having a bearing plate mounted thereon, means on said base member providing a flat top face thereon of less area than said base member, a circular rotatable member having a hub portion mounted for rotation on said shaft above said base member and engaging said bearing plate, a bearing sleeve mounted between said shaft and the hub portion of said rotatable member, a plate-like top member having a circular body portion arranged co-axially to said shaft and having a central hub portion mounted on said shaft, means for mounting said top member in fixed position on said base member comprising means between said base member and top member spacing said top member from said base member to provide for rotation of said rotatable member between said flat top face and the bottom face of said top member, said rotatable member and said circular body portion having openings therein having marginal edges extending transversely to the rotational path of said rotatable member and adapted to pass each other during rotational movement of said rotatable member, cooperating shear blades mounted along said marginal edges, means for supplying lubricant to said bearing plate and sleeve, and driving means for said rotatable member.

FRANK R. McFARLAND.

REFERENCES CITED

The following references are of record in the file of this patent:

UNITED STATES PATENTS

| Number | Name | Date |
|---|---|---|
| 1,797,950 | Forman | Mar. 24, 1931 |
| 1,992,537 | McNair | Feb. 26, 1935 |
| 2,121,997 | Tikalsky | June 28, 1938 |

FOREIGN PATENTS

| Number | Country | Date |
|---|---|---|
| 11 | Great Britain | Jan. 3, 1910 |